United States Patent
Ahn et al.

(10) Patent No.: US 9,961,742 B2
(45) Date of Patent: May 1, 2018

(54) MULTI-CHANNEL LED DRIVER WITH OVERHEATING PROTECTION CAPABILITIES

(71) Applicant: Magnachip Semiconductor, Ltd., Cheongju-si (KR)

(72) Inventors: Hyun Mo Ahn, Cheongju-si (KR); Zhi Yuan Cui, Cheongju-si (KR); Seung Hwan Lee, Seoul (KR); In Ho Hwang, Incheon-si (KR); James Jung, Seoul (KR); Gyu Ho Lim, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 0 days. days.

(21) Appl. No.: 15/478,986

(22) Filed: Apr. 4, 2017

(65) Prior Publication Data

US 2017/0339756 A1 Nov. 23, 2017

(30) Foreign Application Priority Data

May 17, 2016 (KR) .......................... 10-2016-0060262

(51) Int. Cl.
*H05B 37/00* (2006.01)
*H05B 33/08* (2006.01)

(52) U.S. Cl.
CPC ....... *H05B 33/089* (2013.01); *H05B 33/0812* (2013.01); *H05B 33/0827* (2013.01)

(58) Field of Classification Search
CPC ............ H05B 33/0827; H05B 33/0815; H05B 33/083; H05B 33/0845; H05B 33/0803; H05B 33/0884; H05B 33/0836; H05B 33/0842; H05B 33/0854; H05B 37/02; H05B 33/0848; H05B 33/086; H05B 37/0227; H05B 33/0824
See application file for complete search history.

(56) References Cited

U.S. PATENT DOCUMENTS

2014/0009455 A1* 1/2014 Li .................... G09G 3/3406
345/212
2015/0061390 A1* 3/2015 Zhang ................ H05B 33/0827
307/32

\* cited by examiner

*Primary Examiner* — Dedei K Hammond
(74) *Attorney, Agent, or Firm* — NSIP Law

(57) ABSTRACT

An apparatus to drive a multi-channel light emitting diode (LED) array includes switching transistors connected to LED strings of the multi-channel LED array, error amplifiers connected to the switching transistors, each of the error amplifiers being configured to control current flowing through the LED string to have a target magnitude, and overheating protection circuits connected to the switching transistors, each of the overheating protection circuits being configured to regulate current flowing through a respective switching transistor to have a magnitude less than or equal to the target magnitude.

24 Claims, 5 Drawing Sheets

MULTI-CHANNEL LED DRIVER WITH OVERHEATING PROTECTION CAPABILITIES

CROSS-REFERENCE TO RELATED APPLICATIONS

This application claims the benefit under 35 USC 119(a) of Korean Patent Application No. 10-2016-0060262 filed on May 17, 2016 in the Korean Intellectual Property Office, the entire disclosure of which is incorporated herein by reference for all purposes.

BACKGROUND

1. Field

The following description relates to a light emitting diode (LED) driving device. The following description also relates to a current control technology for protecting overheating in a multi-channel LED driving device.

2. Description of Related Art

Presently, due to a great increase in demand for eco-friendly and low-power products, a light emitting diode (LED) is being applied to uses in home appliances and industrial products as a light source. Such an LED is a device that emits light in response to a voltage being applied to both of its terminals. Due to its advantages of having a small volume, consuming little power, performing a rapid light emitting operation, and having a long lifetime, the LED has been substituted for alternative light sources such as a fluorescent lamp and an incandescent lamp. Furthermore, the LED is also becoming popular for use as a backlight source in a flat panel display such as a liquid crystal display (LCD). Despite its advantages of being operable at a relatively low driving voltage and consuming little power when operating, the LCD inevitably requires a backlight source embedded therein due to the characteristic of the LCD not being able to emit light itself. Accordingly, the LED has firmly established its position as a backlight source in an LCD as a substitute for a conventional cold cathode fluorescent lamp (CCFL).

When the LED is used as a backlight source in a display device, a plurality of LED strings, each having a plurality of serially connected LEDs, are arranged in parallel to form a multi-channel LED array. The LED strings of the plurality of LED strings respectively form a plurality of channels in the multi-channel LED array. In such a configuration, all of the LED strings of the LED array are driven by the same voltage source. The voltage source is required to be able to provide a sufficient operating current by which each of the LED strings is able to be stably driven, even under the worst of circumstances or operating conditions such as a change in input voltage or a change in temperature. For this objective, a dynamically controlled voltage may be supplied to the LED strings based on headroom control. For example, such headroom control may refer to an ability of a system to operate using high power levels without signal distortion. Each of the LED strings receives a stable voltage from the voltage source and is driven by a substantially uniformly controlled current, such that each of the LED strings is able to provide an optical output that is mostly consistent.

Meanwhile, considerable variations may exist in bias voltages actually required for operating the LED strings in the multi-channel LED array. These variations occur because, even if each of the LED strings is designed identically to the other strings, LEDs forming a corresponding LED string may have different forward bias voltages (VFs). For example, such differences may occur due to variations in the manufacturing process thereof, and a sum of the VFs of the LEDs may be different from those of the other strings. Sums of the VFs of the LED strings forming a multi-channel LED array may exhibit ±10% or more of difference from one another in some cases. A problem encountered with the LED strings in the multi-channel LED array having these properties is that variations in the bias voltages actually required to drive the LED strings may be disadvantageous in terms of power consumption. The drain voltages of the field effect transistors (FETs) respectively connected to the LED strings may also be different from one another when variations exist in the bias voltages required to drive the LED strings. In such an example, a drain voltage of an FET connected to an LED string requiring a relatively small bias voltage may be larger than that of an FET connected to an LED string requiring a relatively large bias voltage. When a drain voltage of an FET is large, a greater amount of power, corresponding to the large voltage, is consumed by the corresponding FET, and the consumed power is converted to thermal energy and sharply increases a temperature of the corresponding FET. Thus, when large variations in the bias voltages required to drive the LED strings exist, it is difficult to use a multi-channel LED driver for a purpose of operating a multi-channel LED array, at least for the reasons discussed above. Even so, it is not a feasible approach to merely use a plurality of LED drivers exclusively for each channel since it is disadvantageous to do so from the standpoint of the manufacturing cost. Also, although the bias voltages required to drive LED strings may be constantly adjusted when LEDs having the same VFs are used, this approach is also not a practical solution because it requires a sorting task and thus causes a unit price of an LED to increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus to drive a multi-channel light emitting diode (LED) array includes switching transistors connected to LED strings of the multi-channel LED array, error amplifiers connected to the switching transistors, each of the error amplifiers being configured to control current flowing through the LED string to have a target magnitude, and overheating protection circuits connected to the switching transistors, each of the overheating protection circuits being configured to regulate current flowing through a respective switching transistor to have a magnitude less than or equal to the target magnitude.

The LEDs included in the LED strings may have different forward bias voltages.

Each of the switching transistors may be a lateral diffused metal-oxide-semiconductor field effect transistor (LDMOS-FET), a junction gate field effect transistor (JFET), a metal-oxide-semiconductor field effect transistor (MOSFET), an insulated gate bipolar transistor (IGBT), or a bipolar junction transistor (BJT).

The error amplifiers may be differential amplifiers or operational amplifiers.

Each of the switching transistors may be grounded via a sensing resistor, each of the switching transistors may include a first terminal connected to the respective LED string and a second terminal connected to the respective sensing resistor, and each of the overheating protection circuits may be configured to provide a current dividing path between the first and second terminals of the respective switching transistor.

A resistive element and a switch may be provided in the current dividing path.

The resistive element may include a resistor, resistors connected in parallel, a metal-oxide-semiconductor field-effect transistor (MOSFET), or a bipolar junction transistor (BJT).

The switch may include a metal-oxide-semiconductor field-effect transistor (MOSFET) or a bipolar junction transistor (BJT).

The switch may be configured to be switched on in response to an electrical quantity indicative of a magnitude of current flowing through the respective sensing resistor being greater than or equal to a voltage level.

The electrical quantity indicative of the magnitude of the current flowing through the respective sensing resistor may include a voltage level at the second terminal of the respective switching transistor, each of the overheating protection circuits may include a comparator configured to compare the voltage level at the second terminal of the respective switching transistor with the voltage level, and an output from the comparator may be inputted into a control input terminal of the one transistor in accordance with a pulse width modulation (PWM) signal from a PWM signal generator.

The switch may be configured to be switched in response to an electrical quantity indicative of a magnitude of current flowing through the respective sensing resistor and a pulse width modulation (PWM) signal from a PWM signal generator.

In another general aspect, an apparatus to protect a light emitting diode (LED) from overheating includes switching transistors connected to LED strings, and shunt current branches connected in parallel to the switching transistors, wherein each of the shunt current branches includes a resistive element and a switch connected in series, and the switch is configured to be switched on in response to a condition being met.

Each of the switching transistors may be grounded via a sensing resistor and the condition includes a condition that an electrical quantity indicative of a magnitude of current flowing through the respective sensing resistor is greater than or equal to a voltage level.

The electrical quantity indicative of the magnitude of the current flowing through the respective sensing resistor may include a voltage drop across the respective sensing resistor.

The resistive element may include one of a resistor, resistors connected in parallel, a metal-oxide-semiconductor field-effect transistor (MOSFET), and a bipolar junction transistor (BJT).

The switch may include one of a metal-oxide-semiconductor field-effect transistor (MOSFET) and a bipolar junction transistor (BJT).

A resistance of the resistive element may be determined based at least in part on a magnitude of a drain-source voltage of the switching transistor prone to causing overheating of the switching transistor and a magnitude of current intended to be flowing into the shunt current branch.

In another general aspect, an apparatus for driving light emitting diode (LED) strings includes constant current control circuits connected to the LED strings, each of the constant current control circuits being configured to control current flowing through a respective LED string and including a switching transistor connected to the respective LED string, and overheating protection circuits connected to the constant current control circuits, each of the overheating protection circuits being configured to provide a current dividing path for the current flowing through the respective LED string in response to detection of the current having a magnitude greater than or equal to a magnitude of current, wherein the current is divided between the respective switching transistor and the current dividing path by the provision of the current dividing path.

Each of the switching transistors may include a first terminal connected to the respective LED string and a second terminal, and the magnitude of current may be determined based, at least, in part on an amount of power consumption by the switching transistor prone to causing a temperature of the switching transistor to increase beyond a maximum allowable temperature and a maximum voltage drop between the first and second terminals of the switching transistor that is expected from a statistically determined deviation in forward bias voltage between the LED strings.

Each of the switching transistors may be grounded via a sensing resistor, each of the switching transistors may include a first terminal connected to the respective LED string and a second terminal connected to the respective sensing resistor, the current dividing path may be formed between the first and second terminals of the respective switching transistor, and a resistive element and a switch may be provided in the current dividing path.

The switch may be controlled to be switched on in response to a voltage drop across the respective sensing resistor being greater than or equal to a voltage level.

The resistive element may include one of a resistor, resistors connected in parallel, a metal-oxide-semiconductor field-effect transistor (MOSFET), and a bipolar junction transistor (BJT).

The switch may include one of a metal-oxide-semiconductor field-effect transistor (MOSFET) and a bipolar junction transistor (BJT).

In another general aspect, an apparatus to drive light emitting diode (LED) strings includes constant current control circuits connected to the LED strings, each of the constant current control circuits being configured to control current flowing through a respective LED string and including a switching transistor connected to the respective LED string, and each of the switching transistors having a first terminal connected to the respective LED string and a second terminal, and overheating protection circuits connected to the constant current control circuits, each of the overheating protection circuits being configured to provide a current dividing path for the current flowing through the respective LED string in response to detecting that a voltage drop between the first and second terminals of a respective switching transistor is greater than or equal to a voltage level, wherein the current is divided between the respective switching transistor and the current dividing path by the provision of the current dividing path.

In another general aspect, an apparatus to drive light emitting diode (LED) strings includes constant current control circuits connected to the LED strings, each of the constant current control circuits being configured to control current flowing through a respective LED string and including a switching transistor connected to the respective LED string, and each of the switching transistors including a first terminal connected to the respective LED string, and overheating protection circuits connected to the constant current control circuits, each of the overheating protection circuits being configured to provide a current dividing path for the current flowing through the respective LED string in response to detecting that a voltage level at the first terminal of a respective switching transistor is greater than or equal to a voltage level, wherein the current is divided between the respective switching transistor and the current dividing path by the provision of the current dividing path.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
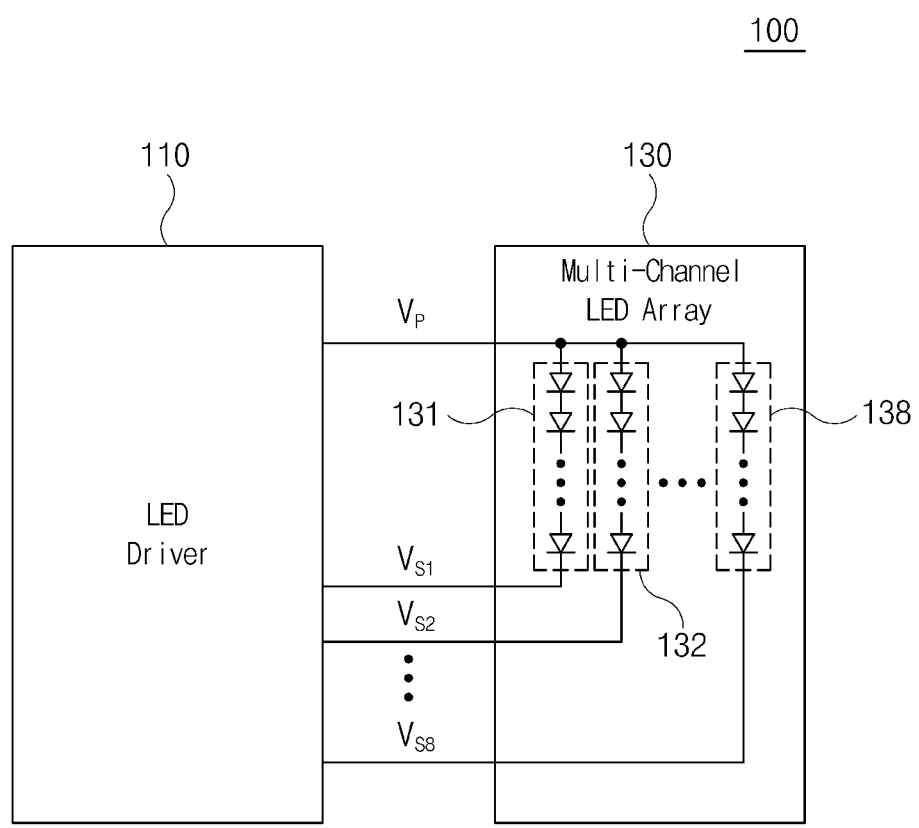
FIG. 1 is a view illustrating an example of a block diagram of a light emitting diode (LED) system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In this disclosure, various examples and implementations are described in further detail to provide a multi-channel light emitting diode (LED) driver with overheating protection capabilities. Reference will now be made in detail to embodiments, some examples of which are illustrated in the accompanying drawings. The features and advantages of the disclosed technology will become more apparent by referring to the embodiments of the disclosed technology given in conjunction with the attached drawings. However, the disclosed technology is not limited to the embodiments described below but may be embodied in various different ways. Like reference numerals refer to the like elements throughout.

As used herein, all terminologies, including technical and scientific terms, are to be defined by definitions commonly shared by those skilled in the art to which the invention pertains unless a different definition is provided. Also, general terms and phrases whose definitions are provided in a common dictionary are not to be interpreted out of the common understanding unless another definition is explicitly provided.

Advantages and features of the invention and methods of accomplishing them are to be made apparent by referencing the embodiments which are described in detail in conjunction with the accompanying drawings. However, the present invention is not to be limited to the embodiments set forth herein and may be embodied in different forms. The present embodiments are only provided so that the disclosure of the invention is sufficiently complete so that one of ordinary skill in the art may understand the full scope of the invention, and the present invention is only to be defined by the appended claims.

The terminology used herein is used for the purpose of describing particular embodiments only and is not intended to be limiting the invention. Terms used in the present disclosure include a plural meaning unless clearly stated otherwise in the context. In this application, the terms "comprise" or "include" are intended to designate that a feature, number, step, operation, element, part, or combination thereof as described in the present disclosure includes the presence or addition of one or more other features, numbers, steps, actions, components, parts, or a combination thereof, but do not preclude the addition or presence of other features, numbers, steps, actions, components, parts, or a combination thereof.

Embodiments of the present disclosure are described in further detail below with reference to the appended drawings. However, in the following description, when there is a risk of a description of a known function of configuration unnecessarily obscuring the subject matter of the present invention, such a description of the known function or configuration is omitted.

Examples are directed to providing a multi-channel light emitting diode (LED) driver capable of preventing heat generation due to an overconsumption of power even when variations exist in bias voltages of LED strings in a multi-channel LED array.

FIG. 1 is a view illustrating an example of a block diagram of an LED system.

Referring to the example of FIG. 1, an LED system 100 includes an LED driver 110 and a multi-channel LED array 130. For example, the LED system 100 is a backlight unit (BLU) in a flat panel display such as a liquid crystal display (LCD). In this example, the multi-channel LED array 130 is formed of a plurality of LEDs that emit light in response to an LED driving voltage Vp. In the example of FIG. 1, the multi-channel LED array 130 includes a plurality of LED strings 131 to 138. As illustrated, each of the LED strings 131 to 138 includes a plurality of LEDs serially connected to one another in such a manner that a cathode terminal of one LED is connected to an anode terminal of an adjacent LED and has a first terminal receiving the driving voltage Vp from the LED driver 110 and a second terminal at the other end. However, the LEDs included in each of the LED strings 131 to 138 may have different forward bias voltages (VFs) due to variations in the manufacturing process thereof, and a sum of the VFs of the LEDs included in each of the LED strings 131 to 138 may also be different from those for the other strings. Although the multi-channel LED array 130 is portrayed as being an eight channel (8-CH) LED array including eight LED strings in the illustrated example of FIG. 1, the number of channels of the multi-channel LED array 130 is not limited thereto, and other numbers of channels are used in other examples.

In the example of FIG. 1, the LED driver 110 is configured to be controlled so that all of the LEDs included in the LED strings 131 to 138 are turned on and it is further configured to output a proper driving voltage Vp as controlled according to various other conditions. In an example, the LED driver 110 is configured to perform headroom control to dynamically control the driving voltage Vp that is supplied to the multi-channel LED array 130. For example, the LED driver 110 is further configured to perform the function of guaranteeing that a sufficient current is supplied to the LED strings 131 to 138 by controlling a current flowing through each of the LED strings 131 to 138 so as to have a desired current value. In such an example, the LED driver 110 is further configured to control current supplied to the LED strings 131 to 138 in response to receiving a pulse width modulation (PWM) signal from a PWM signal generator having a duty ratio that varies according to a dimming level. In an example, the LED driver 110 is designed to prevent the LED driver 110 from being overheated beyond a prescribed temperature due to excess power consumption occurring in at least one of the switching transistors respectively connected to the LED strings 131 to 138, even when variations exist in the bias voltages required to drive the LED strings, as is described further below.

Figure 2:
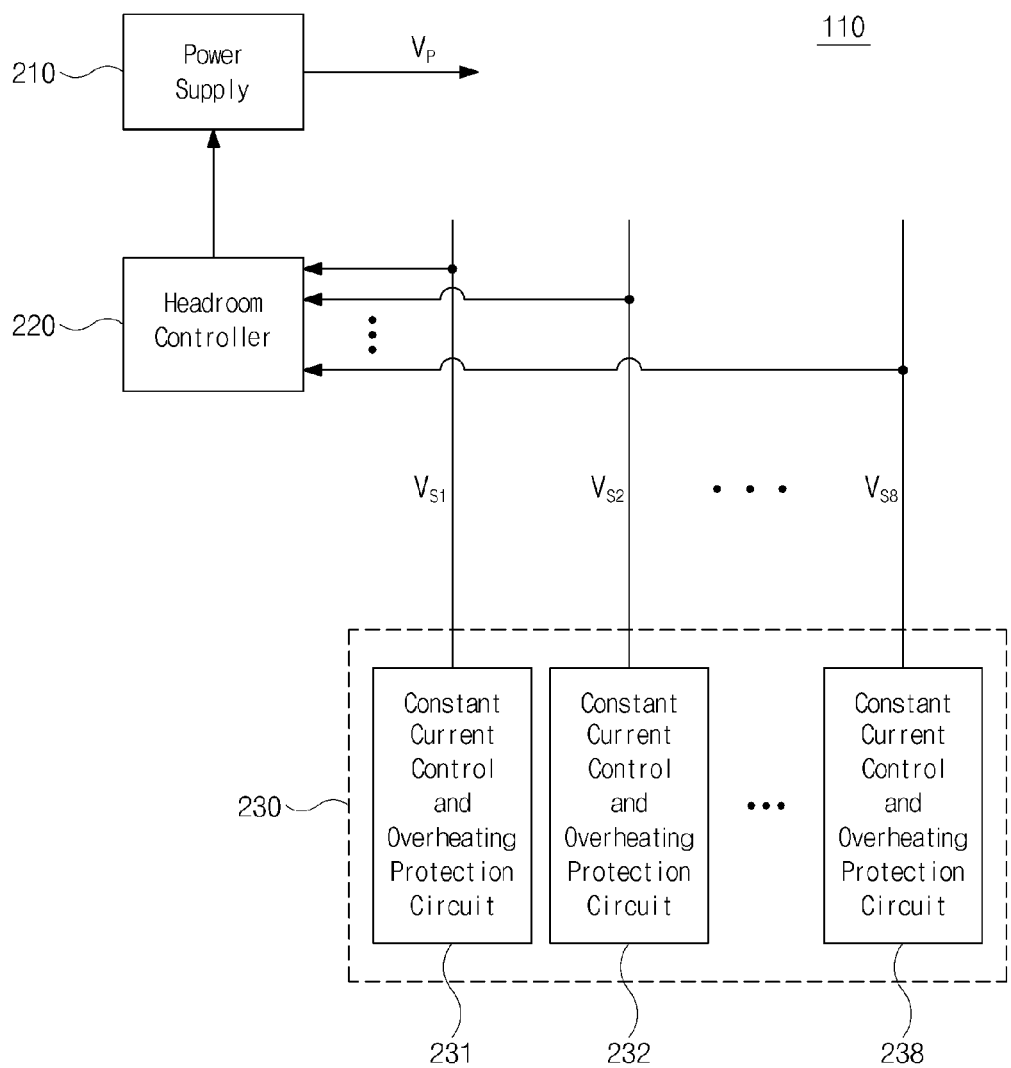
FIG. 2 is a view illustrating an example of a block diagram of the LED driver illustrated in FIG. 1.

FIG. 2 is a view illustrating an example of a block diagram of the LED driver illustrated in FIG. 1. It is to be noted that the elements illustrated in FIG. 2 do not correspond to all functions of the LED driver, and are thus not necessarily required for the LED driver, and the LED driver may include more or fewer elements than illustrated.

Referring to the example of FIG. 2, the LED driver 110 includes a power supply 210 and a headroom controller 220. The power supply 210 includes, for example, a direct current (DC)-DC converter, such as a boost converter, that receives and boosts a DC input voltage to output a stable and high DC voltage. In the example of FIG. 2, the power supply 210 is designed to stably supply the driving voltage Vp even in the most undesirable circumstances and use cases, such as a change in DC input voltage level or a change in temperature. In an example, the power supply 210 is implemented using elements appropriately chosen from an inductor, a capacitor, one or more resistors, a metal-oxide-semiconductor field-effect transistor (MOSFET), a diode, and so on. In an example, the power supply 210 is designed based on a known modulation technique such as PWM and pulse frequency modulation (PFM). In this example, the power supply 210 is configured to output the driving voltage Vp as being dynamically controlled according to a headroom control signal from the headroom controller 220.

For example, the headroom controller 220 is connected to the second terminals of the LED strings 131 to 138 and is configured to output a corresponding headroom control signal based on voltage levels $V_{s1}$ to $V_{s8}$ at the second terminals so that a level of the driving voltage Vp provided from the power supply 210 to the first terminals of the LED strings 131 to 138 is controlled accordingly. The headroom controller 220 is configured to generate the headroom control signal based on the smallest voltage level among the voltage levels $V_{s1}$ to $V_{s8}$ at the second terminals of the LED strings 131 to 138. Because an LED string having the smallest voltage level at the second terminal is an LED string requiring the largest bias voltage, that is, is an LED string having the largest sum of VFs, the driving voltage Vp is required to be controlled based on such an LED string for all of the LED strings 131 to 138 to stably operate.

Also, in the example of FIG. 2, the LED driver 110 further includes a current controller 230 connected to the second terminals of the LED strings 131 to 138. The current controller 230 includes constant current control and overheating protection circuits 231 to 238, respectively connected to the second terminals of the LED strings 131 to 138. Each of the LED strings 131 to 138 and each of the constant current control and overheating protection circuits 231 to 238 form a single channel. In the example of FIG. 2, each of the constant current control and overheating protection circuits 231 to 238 is configured to control current flowing through the corresponding LED string to have a target current value $I_T$. As described above, large variations may exist between the voltage levels $V_{s1}$ to $V_{s8}$ at the second terminals of the LED strings 131 to 138. Accordingly, a channel whose voltage level at the second terminal is extremely large may very likely exist. Therefore, the constant current control and overheating protection circuits 231 to 238 are designed to prevent the LED driver 110 from overheating due to excess power consumption by providing the channel whose voltage level at the second terminal is extremely high.

Figure 3:
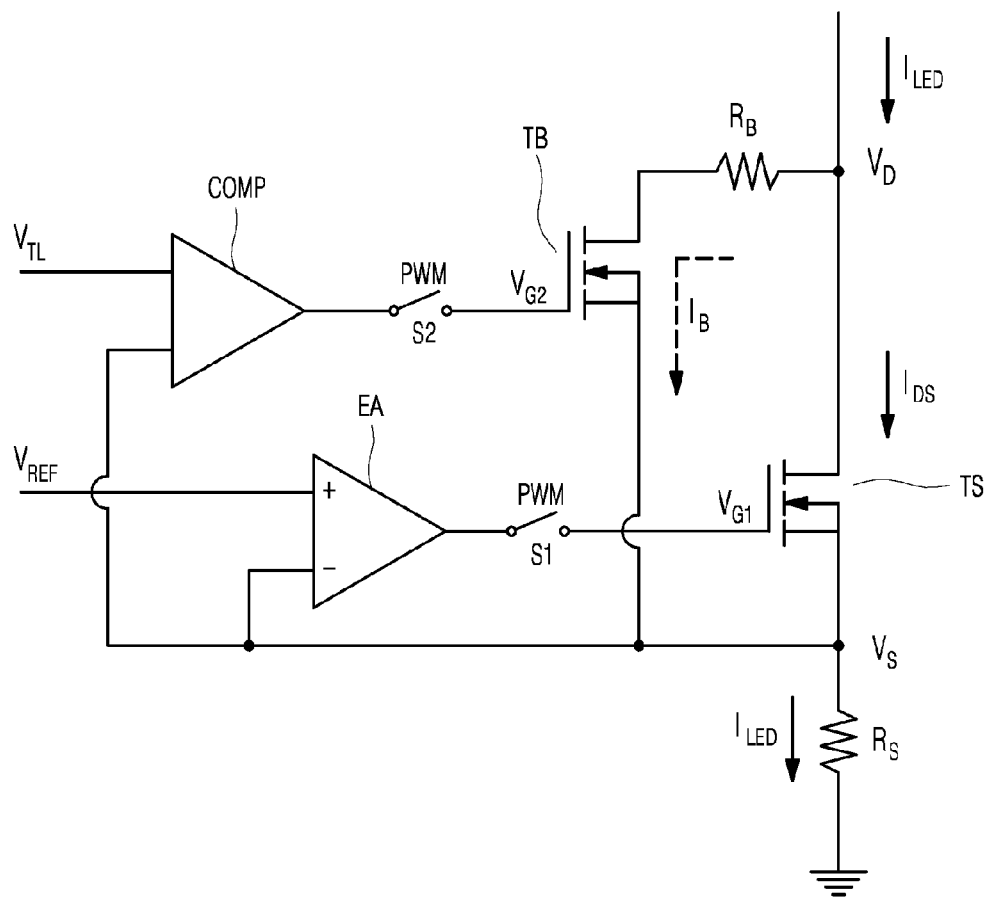
FIG. 3 is a view illustrating an example of a circuit diagram of the constant current control and overheating protection circuit illustrated in FIG. 2.

FIG. 3 is a view illustrating an example of a circuit diagram of the constant current control and overheating protection circuit illustrated in FIG. 2.

As illustrated in the example of FIG. 3, the constant current control and overheating protection circuits 231 to 238 each include a constant current control circuit formed of a switching transistor TS, a sensing resistor Rs, and an error amplifier EA. According to the example of FIG. 3, the sensing resistor Rs has a first terminal connected to the switching transistor TS and a second terminal at its other end. The second terminal of the sensing resistor Rs is grounded, for example, as illustrated. In such an example, the switching transistor TS has a first terminal connected to the second terminal of the respective one of the LED strings 131 to 138, a second terminal connected to the first terminal of the sensing resistor Rs, and a control input terminal. Although any one of a lateral diffused MOSFET (LDMOS-FET), a junction gate FET (JFET), a MOSFET, an insulated gate bipolar transistor (IGBT), and a bipolar junction transistor (BJT) are possible types of transistor selected and used as the switching transistor TS, it is to be noted that the types of transistors for use as the switching transistor TS are not limited to these types of transistor, and other appropriate transistors are used in other examples. When the switching transistor TS is an n-type MOSFET as illustrated in FIG. 3, a first terminal of the switching transistor TS is a drain terminal, a second terminal of the switching transistor TS is a source terminal, and a control input terminal of the switching transistor TS is a gate terminal to which a gate voltage $V_{G1}$ is inputted. In the descriptions below, it is assumed that the switching transistor TS is an n-type MOSFET for the convenience of description.

In the example of FIG. 3, the error amplifier EA has a non-inverting input terminal to which a reference voltage $V_{REF}$ is inputted and an inverting input terminal connected to the source terminal of the switching transistor TS or the first terminal of the sensing resistor Rs. In an example, the error amplifier EA is implemented using a differential amplifier, such as an operational amplifier or OP amplifier having two differential inputs. In such an example, an output of the error amplifier EA is inputted into the gate terminal of the switching transistor TS according to a PWM signal from the PWM signal generator. As is already known in the art, a PWM signal may be a square wave signal whose duty ratio is controlled according to a desired dimming level. Accordingly, in the example of FIG. 3, the output of the error amplifier EA is inputted into the gate terminal of the switching transistor TS during the high level interval of the square wave signal. In the illustrated example, although it is illustrated that a PWM signal controls a switch S1 to be turned on or off for dimming control, it is also possible for the PWM signal to be inputted into an enable terminal of the error amplifier EA so that the error amplifier EA is enabled or disabled according to the PWM signal. The error amplifier EA operates to control the switching transistor TS so that the current $I_{LED}$ flowing through the LED string connected to the switching transistor TS has a target current value $I_T$. In such an example, the reference voltage $V_{REF}$ inputted into the non-inverting input terminal of the error amplifier EA for providing a constant current control is set to a value corresponding to a product of the target current value $I_T$ and a resistance value of the sensing resistor Rs.

When the reference voltage $V_{REF}$ is inputted into the non-inverting input terminal of the error amplifier EA, the gate voltage $V_{G1}$ is applied to the gate terminal of the switching transistor TS so that the current $I_{DS}$ flows between the drain and the source of the switching transistor TS. When the current $I_{LED}$ flowing through the sensing resistor Rs has a smaller value than the target current value $I_T$, a voltage inputted into the inverting input terminal of the error amplifier EA becomes smaller than the reference voltage $V_{REF}$. Accordingly, the error amplifier EA increases its output. The increased output is inputted into the gate terminal of the switching transistor TS, and a larger current $I_{DS}$ flows between the drain and the source of the switching transistor TS. When the current $I_{DS}$ flowing between the drain and the source of the switching transistor TS gradually increases in this manner and the current $I_{LED}$ flowing through the sensing resistor Rs reaches the target current value $I_T$, a voltage inputted into the inverting input terminal of the error amplifier EA becomes equal to the reference voltage $V_{REF}$. Accordingly, the error amplifier EA decreases its output such that the current $I_{DS}$ flowing between the drain and the source of the switching transistor TS is constantly maintained as having the target current value $I_T$. In this manner, as the error amplifier EA controls its output according to a voltage across the sensing resistor Rs, a current flowing through the sensing resistor Rs, that is, the current $I_{LED}$ flowing through the corresponding LED string, is controlled to be substantially the same as the target current value $I_T$.

In the example of FIG. 3, the constant current control and overheating protection circuits 231 to 238 further include an overheating protection circuit formed of a resistive element $R_B$, a switch TB, and a comparator COMP. The overheating protection circuit is configured to operate cooperatively with the constant current control circuit and prevent the switching transistor TS from overheating. The overheating protection circuit, according to the present disclosure, prevents the LED driver 110 from overheating due to excess power consumption by the switching transistor TS. Such an objective is achieved by restricting the current $I_{DS}$ flowing between the drain and the source of the switching transistor TS to be equal to or less than a predetermined level, even when a voltage level $V_D$ at the drain terminal of the switching transistor TS is high. Prior to describing a detailed configuration of the overheating protection circuit, a mechanism by which the switching transistor TS consumes excessive power and causes overheating in a conventional multi-channel LED driver, which does not include the overheat protection circuit according to the examples, is briefly described below.

Figure 4:
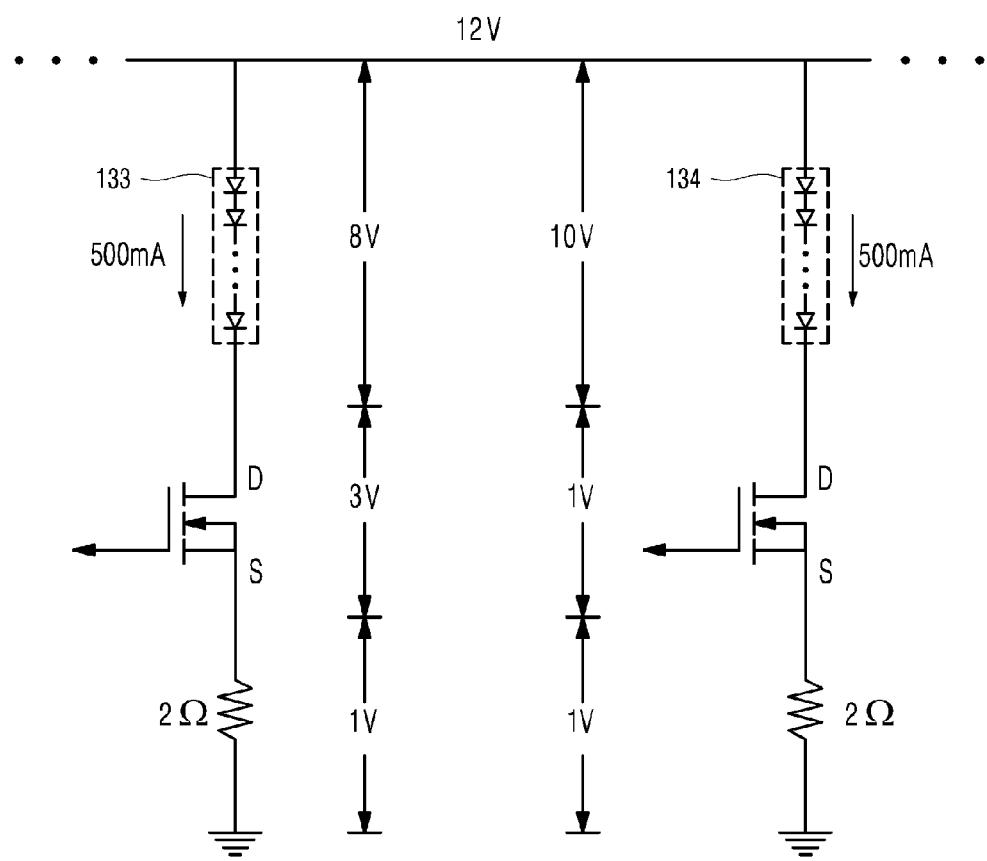
FIG. 4 is a view explaining the principle by which the magnitudes of the voltage drops between the drains and sources of the switching transistors respectively connected to different LED strings are determined according to the magnitudes of the bias voltages of the LED strings.

As described above, in examples, the LED strings 131 to 138 may have different forward bias voltages due to variations in the manufacturing process of the LED strings 131 to 138. Accordingly, the voltage levels $V_{S1}$ to $V_{S8}$ at the second terminals may be different from one another. As discussed, the driving voltage Vp is controlled based on the smallest voltage level among the voltage levels $V_{S1}$ to $V_{S8}$ at the second terminals of the LED strings 131 to 138. As a result, one or more switching transistors TS whose voltage levels $V_D$ at the drain terminal are extremely large exist, wherein the voltage level $V_D$ is chosen to correspond to any one of the voltage levels $V_{S1}$ to $V_{S8}$ at the second terminals of the LED strings 131 to 138. When the voltage level $V_D$ at the drain terminal of the switching transistor TS increases, a voltage drop $V_{DS}$ across the drain and the source also increases. Referring to the example of FIG. 4, when the driving voltage Vp is 12V, all of the currents $I_{DS}$ flowing between the drains and sources of the switching transistors TS are each 500 mA, a resistance value of the sensing resistor Rs is 2 ohms, and the forward bias voltages of the LED strings 133 and 134 are 8V and 10V, respectively, the voltage drop $V_{DS}$ between the drain and the source of the switching transistor TS connected to the LED string 133 is 3V and is relatively high compared to the voltage drop $V_{DS}$ of 1V at another switching transistor TS. Thus, when $V_{DS}$ increases, power consumed by the corresponding switching transistor TS increases as well. The consumed power is converted to thermal energy, and excessive heat is accordingly generated by the corresponding switching transistor TS. Furthermore, in more serious cases, the switching transistor TS is destroyed or rendered inoperative. From the example above, because $V_{DS}$ is 3V and the current $I_{DS}$ is 500 mA, the corresponding power consumed by the switching transistor TS is 1.5 W. According to an experimental result, when approximately 1 W or more power is consumed by the switching transistor TS, the temperature of the switching transistor TS exceeds 85° C. As a result, the switching transistor TS is destroyed when overheated, as above, or otherwise, the temperature of the LED driver 110 may exceed an allowable operation temperature range and cause the LED driver 110 to malfunction even if the switching transistor TS is not completely destroyed.

Referring again to the example of FIG. 3, the resistive element $R_B$ and the switch TB of the overheating protection circuit are serially connected to each other and are connected in parallel between the drain terminal and the source terminal of the switching transistor TS. A first terminal and a second terminal of the resistive element $R_B$ are connected to the drain terminal of the switching transistor TS and a first terminal of the switch TB, respectively. For example, a first terminal and a second terminal of the switch TB are connected to the second terminal of the resistive element $R_B$ and the source terminal of the switching transistor TS, respectively. In such an example, in addition to the first and second terminals, the switch TB further includes a control input terminal to which a control voltage is inputted for controlling current flow from the first terminal to the second terminal. Accordingly, the resistive element $R_B$ and the switch TB form a shunt current branch between the drain terminal and the source terminal of the switching transistor TS. Such a shunt current branch formed with the resistive element $R_B$ and the switch TB provides a current branch path for the current $I_{LED}$ flowing through the LED strings. Due to the current branch path, the current $I_{LED}$ flowing through the LED strings is divided into the current $I_{DS}$ flowing into the switching transistor TS and the current $I_B$ flowing into the current branch path. In an example, the resistive element $R_B$ includes a resistor or a plurality of resistors that are connected in parallel. In another example, the resistive element $R_B$ may include any one of an LDMOSFET, a JFET, a MOSFET, an IGBT, and a BJT. However, these are only examples and other suitable elements are used in other examples. In an example, the transistor TB is implemented using any one transistor, chosen from an LDMOSFET, a JFET, a MOSFET, an IGBT, and a BJT. In one example, the transistor TB is implemented using a transistor having the same characteristics as the switching transistor TS. When the transistor TB is an n-type MOSFET as illustrated, the first terminal of the transistor TB is a drain terminal, the second terminal of the transistor TB is a source terminal, and the control input terminal of the transistor TB is a gate terminal into which a gate voltage $V_{G2}$ is inputted. In the description below, it is assumed that the transistor TB is an n-type MOSFET for the convenience of description.

In the example of FIG. 3, the comparator COMP has two input terminals. The two input terminals include one input terminal into which a trigger level voltage $V_{TL}$ is inputted and the other input terminal being connected to the source terminal of the switching transistor TS or the first terminal of the sensing resistor Rs. In an example, similar to the switching transistor TS, the comparator COMP is implemented using a differential amplifier. For example, an output of the comparator COMP is inputted into the gate terminal of the switch TB according to the PWM signal for providing dimming control, as described above. That is, the output of the comparator COMP is inputted into the gate terminal of the switch TB during the high level interval of the PWM signal. In the illustrated example, although it is shown that the PWM signal controls a switch S2 to be turned on or off, it is also possible for the PWM signal to be inputted into an enable terminal of the comparator COMP so that the comparator COMP is enabled or disabled according to the PWM signal.

For example, the comparator COMP outputs a logic "high" signal when a value indicative of a magnitude of current flowing through the sensing resistor Rs is larger than a trigger level voltage $V_{TL}$, such that the gate voltage $V_{G2}$ is applied to the gate terminal of the switch TB according to the PWM signal to turn on the switch TB. In an example, as illustrated, the value indicative of a magnitude of current flowing through the sensing resistor Rs is a voltage level at the source terminal of the switching transistor TS, that is, a voltage drop across the sensing resistor Rs found as $I_{LED} \times$ Rs. Thus, in this example, the trigger level voltage $V_{TL}$ is determined to be a value resulting from multiplying a predetermined current value by a resistance value of the sensing resistor Rs, as will be described further, below. When the comparator COMP outputs a logic "high" signal to turn on the switch TB, the current $I_{DS}$ flowing through the switching transistor TS is directed to the shunt current branch including the resistive element $R_B$ and the switching transistor TS. Then, due to the operation of the constant current control circuit, the current flowing through the switching transistor TS is controlled to be equal to or less than the target current value $I_T$, even when the current $I_{LED}$ flowing through the sensing resistor Rs reaches the target current value $I_T$.

In an example, a ratio of the current $I_{DS}$ preferred to flow into the switching transistor TS to the current $I_B$ desired to flow into the shunt current branch is set to 1:1, 2:1, 3:1, or a similar ratio. For example, it is assumed that the target current value $I_T$ is 300 mA, and a magnitude of $V_{DS}$ between the drain and the source of the switching transistor TS capable of causing overheating of the switching transistor TS is 3V. Under this example assumption, if the above ratio is set to 2:1, a magnitude of the current $I_B$ that has to flow into the shunt current branch is 100 mA. Thus, a resistance value of the resistive element $R_B$ is determined to be approximately 30 ohms found as the value $V_{DS}/I_B$. It is to be noted that the determination of the resistance value of the resistive element $R_B$ according to the ratio between currents, as described above, is merely an example and that a resistance value of the resistive element $R_B$ is potentially changed depending on various design parameters. According to various examples, even when the target current value $I_T$ is adjusted to be 800 mA, and the current $I_{LED}$ flowing into the LED strings 131 to 138 also increases to approximately 800 mA, the current $I_{LED}$ is accordingly divided between the shunt current branch and the switching transistor TS as discussed to suppress heat generation at the switching transistor TS.

For example, the timing of turning on the switch TB is determined based on one or more electrical variables related to the switching transistor TS. In an example, the time at which the switch TB is to be turned on is determined based at least in part on an amount of power consumption $P_{TS}$ of the switching transistor TS prone to causing a temperature of the switching transistor TS to increase beyond a maximum allowable temperature, and/or a maximum voltage drop ($V_{DS\_MAX}$) between the drain and the source of the switching transistor TS that is expected from a deviation(s) in forward bias voltage between the LED strings 131 to 138. In an example, the deviation(s) in forward bias voltage between the LED strings 131 to 138 are statistically determined, and $V_{DS\_MAX}$ is predicted using the determined deviation(s). For example, if it is assumed that the values of $P_{TS}$ and the $V_{DS\_MAX}$ determined statistically or empirically are 1 W and 3V, respectively, a current $I_{TL}$ that satisfies these assumptions is approximately 333 mA, found as $P_{TS}/V_{DS\_MAX}$. Consequently, as part of the process of the current $I_{LED}$ flowing through the LED strings being increased toward the target current value $I_T$ by the control of the constant current control circuit, the switch TB is required to be turned on to divide the current of 333 mA into the shunt current branch and the switching transistor TS when or before the current $I_{LED}$ reaches a value of 333 mA, which is the current $I_{TL}$ as found, above. Then, the comparator COMP is required to output a logic "high" signal to turn on the switch TB when the current $I_{LED}$ flowing through the LED string becomes the current $I_{TL}$ or alternatively a predetermined current value smaller than the current $I_{TL}$ used as a threshold. To this end, the trigger level voltage $V_{TL}$ of the comparator COMP is determined based on the current $I_{TL}$. In an example, the trigger level voltage $V_{TL}$ of the comparator COMP is determined to be a value resulting from multiplying the current $I_{TL}$ by the resistance value of the sensing resistor Rs. In another example, the trigger level voltage $V_{TL}$ of the comparator COMP is determined to be a value resulting from multiplying the predetermined current value that is smaller than the current $I_{TL}$ by the resistance value of the sensing resistor Rs. In such an example, the trigger level voltage $V_{TL}$ is set to a voltage value lower than the reference voltage $V_{REF}$ inputted into the non-inverting input terminal of the error amplifier EA.

Figure 5:
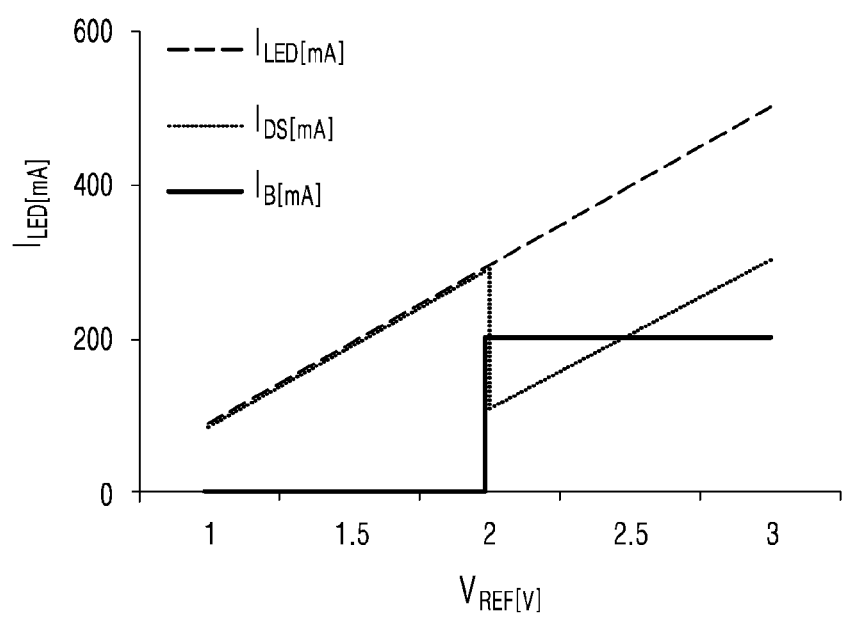
FIG. 5 is a view illustrating an example of a graph showing simulation results of a current ($I_{LED}$) flowing into an LED string, a current ($I_{DS}$) flowing into a switching transistor (TS), and a current ($I_B$) flowing into a shunt current branch, when a trigger level voltage ($V_{TL}$) of a comparator (COMP) is set to 2V and a reference voltage ($V_{REF}$) inputted into a non-inverting input terminal of an error amplifier (EA) is increased from 1V to 3V.

FIG. 5 is a view illustrating an embodiment of a graph showing simulation results of a current ($I_{LED}$) flowing into an LED string, a current ($I_{DS}$) flowing into a switching transistor (TS), and a current ($I_B$) flowing into a shunt current branch, in a use case in which a trigger level voltage ($V_{TL}$) of a comparator (COMP) is set to 2V and a reference voltage ($V_{REF}$) inputted into a non-inverting input terminal of an error amplifier (EA) is increased from 1V to 3V.

Referring to the example of FIG. 5, the current $I_{DS}$ flowing through the switching transistor TS linearly increases to approximately 300 mA until the reference voltage $V_{REF}$ inputted into the non-inverting input terminal of the error amplifier EA increases from 1V to 2V. Until this event occurs, current does not flow to the shunt current branch. Subsequently, when the reference voltage $V_{REF}$ becomes 2V, and the voltage across the sensing resistor Rs becomes 2V, the switch TB is turned on, and the current $I_B$ of approximately 200 mA flows through the shunt current branch. In response, the current $I_{DS}$ drops accordingly to 100 mA. When the reference voltage $V_{REF}$ is continuously increased to 2V or higher, the current $I_B$ flowing through the shunt current branch remains at 200 mA, even while the current $I_{DS}$ linearly increases again. In any case, the relation, $I_{LED}=I_{DS}+I_B$ still holds throughout these operations.

Although it has been illustrated in the examples disclosed above that the overheat protection circuit turns on the switch TB based on a value indicative of a magnitude of the current flowing through the sensing resistor Rs, those of ordinary skill in the art will be able to make various modifications to the embodiments disclosed above with reference thereto. In an example, the overheating protection circuit may be configured to detect that $V_{DS}$ between the drain and the source of the switching transistor TS is equal to or greater than a predetermined voltage level, and to accordingly provide a shunt current branch for the current flowing through the LED strings 131 to 138 in response to the detection. In another example, the overheat protection circuit is also configured to detect that a voltage level at the drain terminal of the switching transistor TS is equal to or greater than a predetermined voltage level, and to provide a shunt current branch for the current flowing through the LED strings 131 to 138 in response to the detection. In the modified examples, a current branch path is selectively provided only in one or more channels having the switching transistor TS, in which $V_{DS}$ between the drain and the source of the switching transistor TS is equal to or greater than a predetermined voltage level or whose drain terminal has a voltage level that is equal to or greater than a predetermined voltage level. Such modified examples are all to be construed as belonging to the scope of the present disclosure.

Although the elements/circuits of the LED driver 110 have been described as separate elements in the above disclosure, all of the elements/circuits of the LED driver 110 are optionally able to be implemented as a single integrated circuit (IC) chip based on the design rules of an application specific integrated circuit (ASIC), a programmable logic device (PLD), or a field-programmable gate array (FPGA). Depending on specific design rules, it is also possible to implement the elements/circuits of the LED driver 110 other than the switching transistors TS as being integrated into a single IC chip. In addition, depending on further specific design rules, the elements/circuits of the LED driver 110 other than either or both of the resistive elements $R_B$s and the switches TB may also be implemented as a single IC chip. In various examples, the LED driver 110 is also implemented using a system-on-chip (SOC) architecture for an embedded system.

According to the examples disclosed herein, power consumed by the switching transistor(s) in the multi-channel LED driver for driving a multi-channel LED array is capable of being efficiently controlled even when variations exist in the forward bias voltages of the LED strings in the multi-channel LED array, thereby suppressing a temperature increase in the multi-channel LED driver and ensuring a stable operation thereof.

Also, in the examples disclosed herein, the arrangement of the illustrated components may vary depending on an environment or requirements to be implemented. For example, some of the components may be omitted or several components may be integrated and carried out together. In addition, the arrangement order of some of the components and the like may be changed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus to drive a multi-channel light emitting diode (LED) array, comprising:
   a circuit connected to an LED string and comprising
      a switching transistor comprising a first terminal and a second terminal,
      an error amplifier connected to the switching transistor and configured to control current flowing through the LED string to have a target magnitude, and
      an overheating protection circuit connected to the switching transistor and configured to regulate current flowing through the switching transistor to have a magnitude less than or equal to the target magnitude by providing a current dividing path between the first and second terminals, wherein the overheating protection circuit comprises a comparator configured to compare a voltage at the second terminal to a trigger level voltage to control current flow through the current dividing path.

2. The apparatus of claim 1, wherein LEDs included in the LED string have different forward bias voltages.

3. The apparatus of claim 1, wherein the switching transistor is a lateral diffused metal-oxide-semiconductor field effect transistor (LDMOSFET), a junction gate field effect transistor (JFET), a metal-oxide-semiconductor field effect transistor (MOSFET), an insulated gate bipolar transistor (IGBT), or a bipolar junction transistor (BJT).

4. The apparatus of claim 3, wherein the error amplifier comprises a differential amplifier or an operational amplifier.

5. The apparatus of claim 1, wherein the switching transistor is grounded via a resistor.

6. The apparatus of claim 5, wherein the current dividing path comprises a resistive element and a switch.

7. The apparatus of claim 6, wherein the resistive element comprises a resistor, resistors connected in parallel, a metal-oxide-semiconductor field-effect transistor (MOSFET), or a bipolar junction transistor (BJT).

8. The apparatus of claim 6, wherein the switch comprises a metal-oxide-semiconductor field-effect transistor (MOSFET) or a bipolar junction transistor (BJT).

9. The apparatus of claim 8, wherein the switch is configured to be switched on in response to an electrical quantity indicative of a current flowing through the respective resistor being greater than or equal to the trigger level voltage.

10. The apparatus of claim 9, wherein the electrical quantity indicative of the current flowing through the respective resistor comprises the voltage at the second terminal of the respective switching transistor, and an output from the comparator is provided into a terminal of the respective switch in accordance with a pulse width modulation (PWM) signal from a PWM signal generator.

11. The apparatus of claim 8, wherein each switch is configured to be switched in response to an electrical quantity indicative of a current flowing through the respective resistor and a pulse width modulation (PWM) signal from a PWM signal generator.

12. An apparatus to protect a light emitting diode (LED) driver from overheating, comprising:
   switching transistors connected to LED strings; and
   shunt current branches respectively connected in parallel to the switching transistors,
   wherein each of the shunt current branches comprises a resistive element and a switch connected in series, and the switch is configured to be switched on in response to a condition being met, and
   wherein a resistance of the resistive element is based at least in part on a drain-source voltage of a respective switching transistor prone to causing overheating of the respective switching transistor, and a current intended to flow into a respective shunt current branch.

13. The apparatus of claim 12, wherein each of the switching transistors is grounded via a resistor and the condition comprises a condition that an electrical quantity indicative of a current flowing through the respective resistor is greater than or equal to a voltage.

14. The apparatus of claim 13, wherein the electrical quantity indicative of the current flowing through the respective resistor comprises a voltage drop across the respective resistor.

15. The apparatus of claim 12, wherein the resistive element comprises one of a resistor, resistors connected in parallel, a metal-oxide-semiconductor field-effect transistor (MOSFET), and a bipolar junction transistor (BJT).

16. The apparatus of claim 12, wherein the switch comprises one of a metal-oxide-semiconductor field-effect transistor (MOSFET) and a bipolar junction transistor (BJT).

17. An apparatus for driving light emitting diode (LED) strings, comprising:
   constant current control circuits connected to the LED strings, each of the constant current control circuits being configured to control current flowing through a respective LED string and comprising a switching transistor comprising a first terminal, connected to the respective LED string, and a second terminal; and
   overheating protection circuits connected to the constant current control circuits, each of the overheating protection circuits being configured to provide a current dividing path for the current flowing through the respective LED string in response to detection of the current being greater than or equal to a particular current, wherein the current is divided between the respective switching transistor and the current dividing path, and wherein the current dividing path is formed between the first and second terminals of the respective switching transistor.

18. The apparatus of claim 17, wherein the particular current for each overheating protection circuit is based at least in part on either one or both of an amount of power consumption by the switching transistor prone to causing a temperature of the switching transistor to increase beyond a maximum allowable temperature and a maximum voltage drop between the first and second terminals of the respective switching transistor based on a deviation in forward bias voltage between the LED strings.

19. The apparatus of claim 17, wherein each of the switching transistors is grounded via a sensing resistor, each of the switching transistors comprises a first terminal connected to the respective LED string and a second terminal connected to the respective sensing resistor, and a resistive element and a switch are provided in the current dividing path.

20. An apparatus to drive light emitting diode (LED) strings, comprising:

constant current control circuits connected to the LED strings, each of the constant current control circuits being configured to control current flowing through a respective LED string and comprising a switching transistor connected to the respective LED string, and each of the switching transistors comprising a first terminal connected to the respective LED string and a second terminal; and overheating protection circuits connected to the constant current control circuits, each of the overheating protection circuits being configured to provide a current dividing path for the current flowing through the respective LED string in response to detecting that a voltage drop between the first and second terminals of a respective switching transistor is greater than or equal to a trigger level voltage, wherein the current is divided between the respective switching transistor and the current dividing path by the provision of the current dividing path.

21. An apparatus to drive light emitting diode (LED) strings, comprising:

constant current control circuits respectively connected to the LED strings, each of the constant current control circuits being configured to control current flowing through a respective LED string and comprising a switching transistor connected to the respective LED string, and each of the switching transistors comprising a first terminal connected to the respective LED string and a second terminal grounded via a resistor; and overheating protection circuits connected to the constant current control circuits, each of the overheating protection circuits being configured to provide a current dividing path for the current flowing through the respective LED string in response to detecting that a voltage at the first terminal of a respective switching transistor is greater than or equal to a trigger level voltage, wherein the current is divided between the respective switching transistor and the current dividing path, wherein the current dividing path is formed between the first and second terminals of the respective switching transistor.

22. The apparatus of claim 21, wherein the current dividing path comprises a switch that is controlled to be switched on in response to a voltage drop across the respective sensing resistor being greater than or equal to the trigger level voltage.

23. The apparatus of claim 21, wherein the current dividing path comprises a resistive element that comprises one of a resistor, resistors connected in parallel, a metal-oxide-semiconductor field-effect transistor (MOSFET), and a bipolar junction transistor (BJT).

24. The apparatus of claim 21, wherein the current dividing path comprises a switch that comprises one of a metal-oxide-semiconductor field-effect transistor (MOSFET) and a bipolar junction transistor (BJT).

* * * * *